United States Patent
Lan

(10) Patent No.: US 11,281,199 B2
(45) Date of Patent: Mar. 22, 2022

(54) PRODUCTION CONTROL SYSTEM

(71) Applicant: SHENZHEN CHINA STAR OPTOELECTRONICS SEMICONDUCTOR DISPLAY TECHNOLOGY CO., LTD., Shenzhen (CN)

(72) Inventor: Yandong Lan, Shenzhen (CN)

( * ) Notice: Subject to any disclaimer, the term of this patent is extended or adjusted under 35 U.S.C. 154(b) by 213 days.

(21) Appl. No.: 16/625,786

(22) PCT Filed: Dec. 3, 2019

(86) PCT No.: PCT/CN2019/122772
§ 371 (c)(1),
(2) Date: Dec. 23, 2019

(87) PCT Pub. No.: WO2021/097918
PCT Pub. Date: May 27, 2021

(65) Prior Publication Data
US 2021/0333783 A1 Oct. 28, 2021

(30) Foreign Application Priority Data
Nov. 21, 2019 (CN) .......................... 201911146992.8

(51) Int. Cl.
*G05B 19/418* (2006.01)

(52) U.S. Cl.
CPC .................. *G05B 19/4188* (2013.01); *G05B 2219/31001* (2013.01)

(58) Field of Classification Search
CPC .................. G05B 19/4188; G05B 2219/31001
See application file for complete search history.

(56) References Cited

U.S. PATENT DOCUMENTS

| | | | | |
|---|---|---|---|---|
| 10,362,069 B2 * | 7/2019 | Skuratovich | ............ | H04L 67/02 |
| 2018/0278692 A1 * | 9/2018 | Okayama | ................ | H04L 67/28 |

* cited by examiner

*Primary Examiner* — Chad G Erdman

(57) ABSTRACT

A production control system includes a terminal server and a manufacturing execution server. The terminal server is configured to transmit a control message. The manufacturing execution server is configured to receive the control message through a first communications protocol and a second communications protocol and to execute a first application module and a second application module according to the control message. The terminal server judges whether a quantity of the control message is greater than a predetermined value; if the quantity of the control message is judged to be greater than the predetermined value, then the terminal server transmits the control message through the first communications protocol; and if the quantity of the control message is judged to be less than or equal to the predetermined value, then the terminal server transmits the control message through the second communications protocol.

9 Claims, 4 Drawing Sheets

PRODUCTION CONTROL SYSTEM

BACKGROUND OF DISCLOSURE

1. Field of Disclosure

The present disclosure relates to the field of intelligent manufacturing technology, and more particularly, to a production control system.

2. Description of Related Art

In an intelligent manufacturing system (IMS), a manufacturing execution system (MES) is used as the basis of smart factories to manage and track materials, production, quality, and devices. However, with an increasing quantity of the intelligent manufacturing system, systems fail to communicate with each other, for an interface standard of each system is not uniform.

Therefore, it is necessary to provide a production control system to solve the above problem.

SUMMARY

A technical problem is that, with an increasing quantity of the intelligent manufacturing system, systems fail to communicate with each other, for an interface standard of each system is not uniform.

The object of the present disclosure is to provide a production control system, which can build a standardized interface to communicate data.

In order to realize the above object, the present disclosure provides a production control system, including:

a terminal server configured to transmit a control message; and a manufacturing execution server configured to receive the control message through a first communications protocol and a second communications protocol and to execute a first application module and a second application module according to the control message;

wherein the terminal server invokes the first application module through one of the first communications protocol and the second communications protocol, and invokes the second application module through the second communications protocol;

wherein the terminal server is connected to the manufacturing execution server through a relay server supporting the second communications protocol;

wherein the terminal server is connected to the manufacturing execution server through a database server supporting the first communications protocol; and wherein the terminal server is configured to:

judge whether a quantity of the control message is greater than a predetermined value;

if the quantity of the control message is judged to be greater than the predetermined value, then transmit the control message through the first communications protocol; and if the quantity of the control message is judged to be less than or equal to the predetermined value, then transmit the control message through the second communications protocol.

In order to realize the above object, the present disclosure further provides a production control system, including: a terminal server configured to transmit a control message; and a manufacturing execution server configured to receive the control message through a first communications protocol and a second communications protocol and to execute a first application module and a second application module according to the control message; wherein the terminal server is configured to: judge whether a quantity of the control message is greater than a predetermined value; if the quantity of the control message is judged to be greater than the predetermined value, then transmit the control message through the first communications protocol; and if the quantity of the control message is judged to be less than or equal to the predetermined value, then transmit the control message through the second communications protocol.

In some embodiments, the terminal server invokes the first application module through one of the first communications protocol and the second communications protocol, and invokes the second application module through the second communications protocol.

In some embodiments, the terminal server includes at least one of a statistic process control module, a fault detection-and-classification module, a virtual metrology module, an internet-of-things module, and a big-data analysis module.

In some embodiments, the terminal server is connected to the manufacturing execution server through a relay server supporting the second communications protocol.

In some embodiments, the terminal server is connected to the manufacturing execution server through a database server supporting the first communications protocol.

In some embodiments, the database server includes an interface table configured to store the control message.

In some embodiments, the first application module includes: a stop-running module configured to stop goods from running and to verify the goods; and a goods-holding module configured to hold the goods at a predetermined station point.

In some embodiments, the second application module includes: a sampling module configured to sample goods; and a turn-off module configured to transmit a turn-off message to a block control system.

In some embodiments, the relay server is a RV server.

In some embodiments, the database server adopts a database link method.

The beneficial effect of the present disclosure is that the production control system of the present disclosure can quickly respond to abnormalities, reduce time and manpower costs, and thus improve yield of product.

BRIEF DESCRIPTION OF DRAWINGS

To ensure the features and the technical content of the disclosure are more apparent and easier to understand, please refer to the explanation and the accompanying drawings of the disclosure as follows. However, the accompanying drawings are merely for reference without limiting the disclosure.

DETAILED DESCRIPTION OF EMBODIMENTS

To ensure the objects, the technical solutions, and the effects of the disclosure are clearer and more specific, the disclosure will be explained in conjunction with the accompanying drawings in detail further below. It should be understood that the embodiments described herein are merely a part of the embodiments of the present disclosure instead of all of the embodiments and not used to limit the disclosure.

Figure 1:
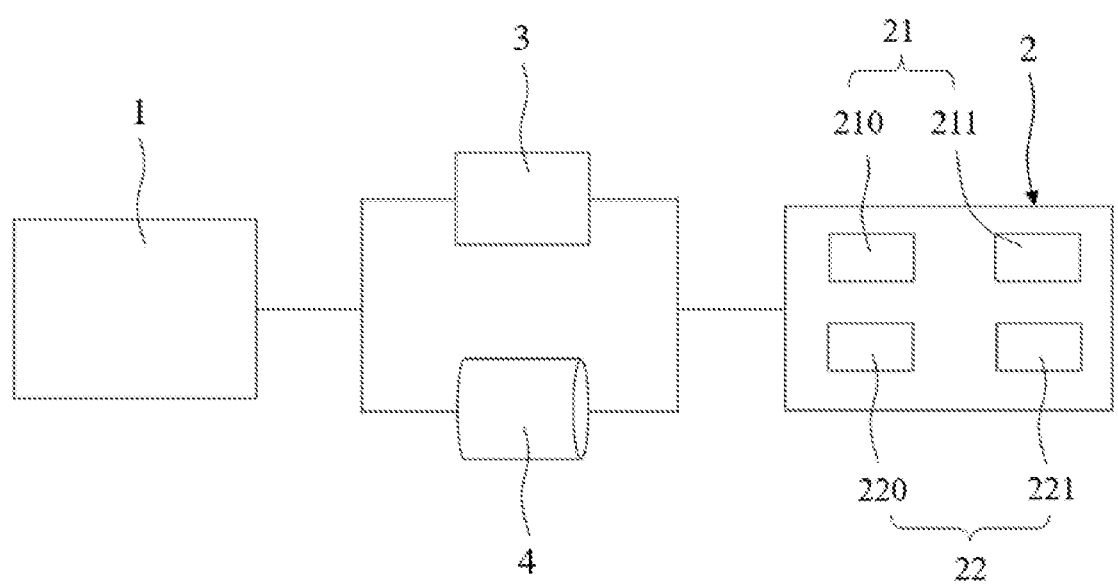
FIG. 1 is a functional block diagram of a production control system according to an embodiment of the present disclosure.

Please refer to FIG. 1, which is a functional block diagram of a production control system according to an embodiment of the present disclosure. The production control system of the present disclosure includes a terminal server 1 and a manufacturing execution server 2. The terminal server 1 is configured to transmit a control message. Specifically, the terminal server 1 is a conventional intelligent manufacturing system that includes at least one of a statistic process control module, a fault detection-and-classification module, a virtual metrology module, an internet-of-things module, and a big-data analysis module. A manufacturing execution server 2 is configured to receive the control message through a first communications protocol and a second communications protocol and to execute a first application module 21 and a second application module 22 according to the control message.

As shown in FIG. 1, the terminal server 1 is connected to the manufacturing execution server 2 through a relay server 3 supporting the second communications protocol. Specifically, the relay server is a RV server. Furthermore, the terminal server 1 is connected to the manufacturing execution server 2 through a database server 4 supporting the first communications protocol. In some embodiments, the database server 4 includes an interface table configured to store the control message. Specifically, the database server 4 adopts a database link (DB link) method. In the present embodiment, the terminal server 1 is configured to: judge whether a quantity of the control message is greater than a predetermined value; if the quantity of the control message is judged to be greater than the predetermined value, then transmit the control message through the first communications protocol; and if the quantity of the control message is judged to be less than or equal to the predetermined value, then transmit the control message through the second communications protocol.

Specifically, when there are numerous control messages, the terminal server 1 writes the control message to the interface table through the DB link method, and then the manufacturing execution server 2 regularly reads the control message on the interface table. Conversely, when there are few control messages, the terminal server 1 broadcasts and transmits the control message to the manufacturing execution server 2 through the RV server.

In the present embodiment, the terminal server 1 invokes the first application module 21 through one of the first communications protocol and the second communications protocol, and invokes the second application module 22 through the second communications protocol. In some embodiments, the first application module 21 includes a stop-running module 210 and a goods-holding module 211; the second application module 22 includes a sampling module 220 and a turn-off module 221. The stop-running module 210 is configured to stop goods from running and to verify the goods. A goods-holding module 211 is configured to hold the goods at a predetermined station point. The sampling module 220 is configured to sample goods. The turn-off module 221 is configured to transmit a turn-off message to a block control system (BCS). The block control system is used to operate production lines and to monitor manufacturing equipment.

Figure 2:
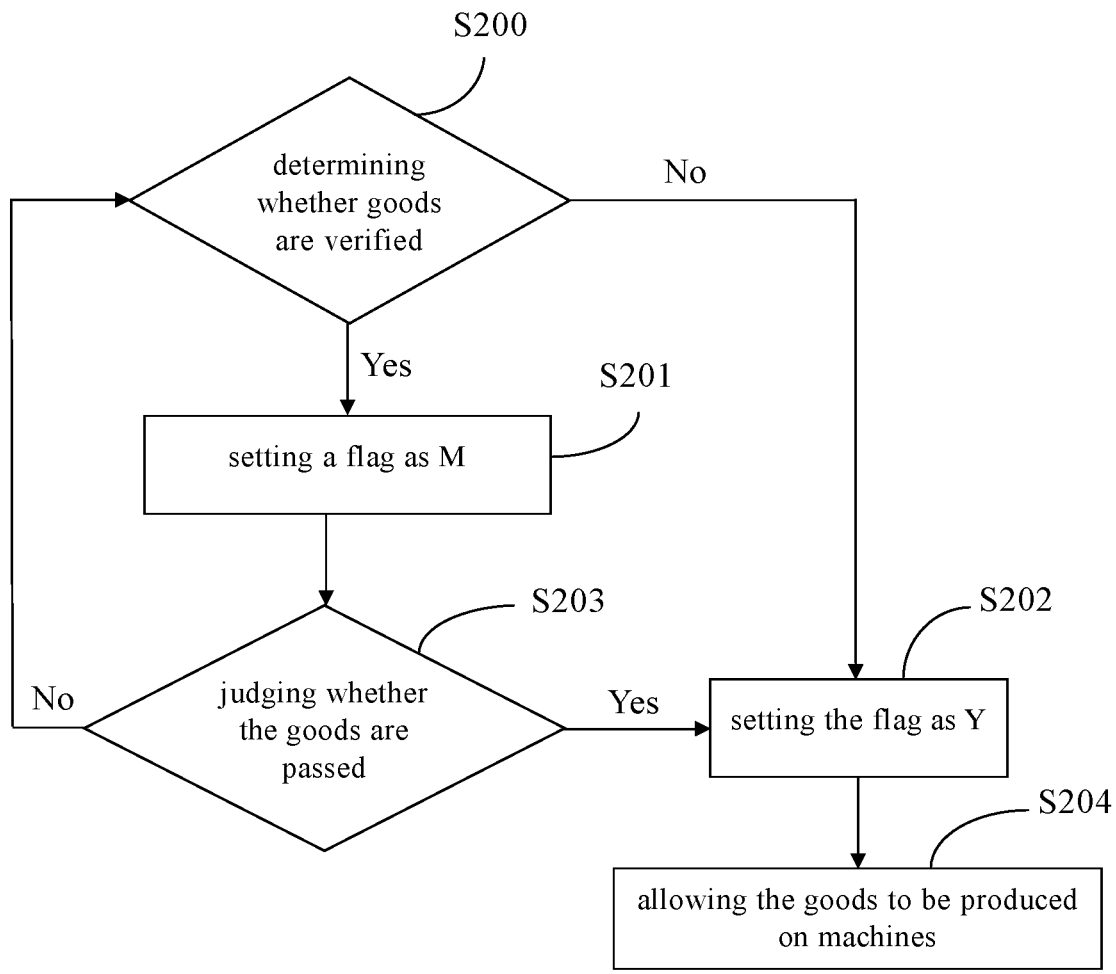
FIG. 2 is a flowchart of a terminal server invoking a stop-running module as shown in FIG. 1.

FIG. 2 is a flowchart of the terminal server invoking the stop-running module as shown in FIG. 1. The flowchart includes the following steps:

Step S200: determining whether goods are verified; if the goods are determined to be verified, then executing step S201; and if the goods are determined not to be verified, then executing step S202.

Step S201: setting a flag as the letter M, and then executing step S203.

Step S202: setting the flag as the letter Y, and then executing step S204.

Step S203: judging whether the goods are passed; if the goods are judged to be passed, then executing step S202; and if the goods are judged to be not passed, then executing step S200.

Step S204: allowing the goods to be produced on machines.

Figure 3:
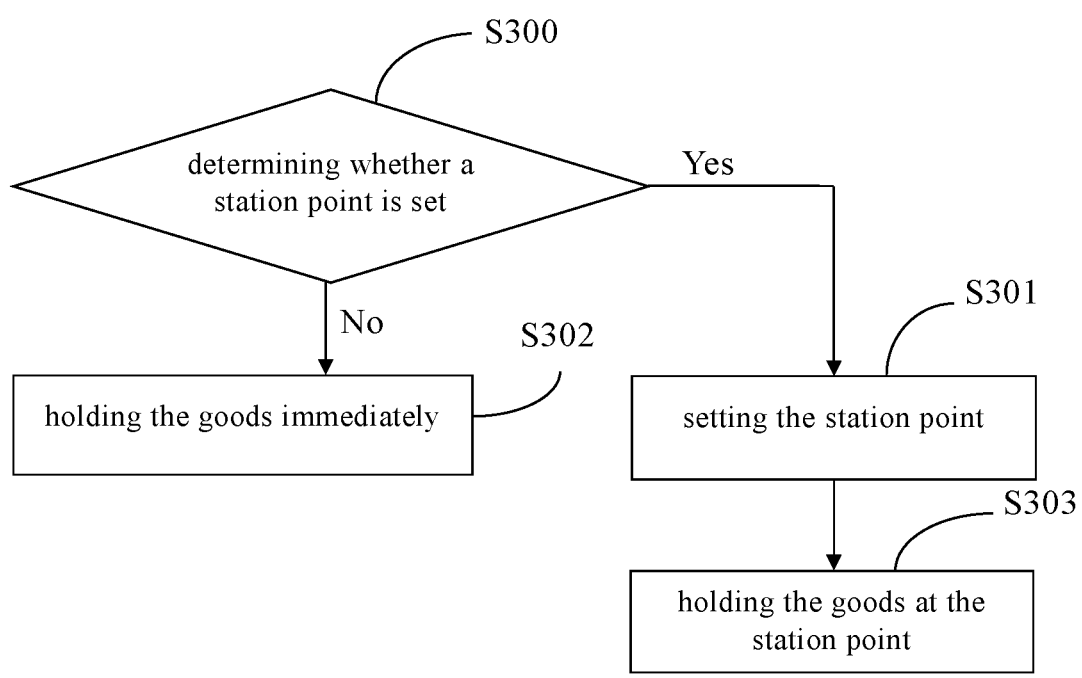
FIG. 3 is a flowchart of a terminal server invoking a goods-holding module as shown in FIG. 1.

FIG. 3 is a flowchart of a terminal server invoking a goods-holding module as shown in FIG. 1. The flowchart includes the following steps:

Step S300: determining whether a station point is set; if the station point is set, then executing step S301; and if the station point is not set, then executing step S302.

Step S301: setting the station point, and then executing step S303.

Step S302: holding the goods immediately.

Step S303: holding the goods at the station point.

Figure 4:
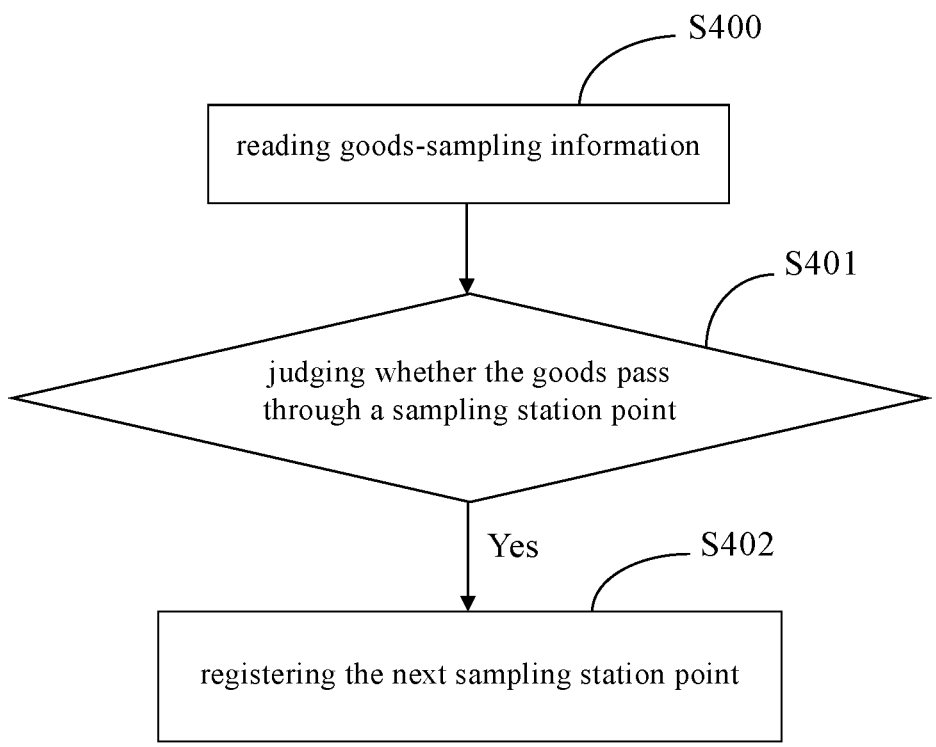
FIG. 4 is a flowchart of a terminal server invoking a sampling module as shown in FIG. 1.

FIG. 4 is a flowchart of a terminal server invoking a sampling module as shown in FIG. 1. The flowchart includes the following steps:

Step S400: reading goods-sampling information.

Step S401: judging whether the goods pass through a sampling station point; if the goods pass through the sampling station point, then executing step S402.

Step S402: registering the next sampling station point.

In conclusion, the present disclosure provides a production control system to build a standardized interface mainly through two communications methods, causing an intelligent manufacturing system to seamlessly connect with a manufacturing execution system. Thus, the production control system can quickly respond to abnormalities, reduce time and manpower costs, and improve yield of product.

It should be understood that the application of the present disclosure is not limited by the foregoing examples. A person of ordinary skill in the art is able to make modifications or changes based on the foregoing description, and all of these modifications and changes are within the scope of the appended claims of the present disclosure.

The industrial applicability of the present disclosure is that a standardized interface is built mainly through two communications methods in the production control system, causing an intelligent manufacturing system to seamlessly connect with a manufacturing execution system.

What is claimed is:

1. A production control system, comprising:
   a terminal server configured to transmit a control message; and
   a manufacturing execution server configured to receive the control message through a first communications protocol and a second communications protocol and to execute a first application module and a second application module according to the control message;
   wherein the terminal server invokes the first application module through one of the first communications protocol and the second communications protocol, and invokes the second application module through the second communications protocol;

wherein the terminal server is connected to the manufacturing execution server through a relay server supporting the second communications protocol;
wherein the terminal server is connected to the manufacturing execution server through a database server supporting the first communications protocol; and
wherein the terminal server is configured to:
  judge whether a quantity of the control message is greater than a predetermined value;
  if the quantity of the control message is judged to be greater than the predetermined value, then transmit the control message through the first communications protocol; and
  if the quantity of the control message is judged to be less than or equal to the predetermined value, then transmit the control message through the second communications protocol.

2. A production control system, comprising:
a terminal server configured to transmit a control message; and
a manufacturing execution server configured to receive the control message through a first communications protocol and a second communications protocol and to execute a first application module and a second application module according to the control message;
wherein the terminal server is configured to:
  judge whether a quantity of the control message is greater than a predetermined value;
  if the quantity of the control message is judged to be greater than the predetermined value, then transmit the control message through the first communications protocol; and
  if the quantity of the control message is judged to be less than or equal to the predetermined value, then transmit the control message through the second communications protocol.

3. The production control system of claim 2, wherein the terminal server invokes the first application module through one of the first communications protocol and the second communications protocol, and invokes the second application module through the second communications protocol.

4. The production control system of claim 2, wherein the terminal server comprises at least one of a statistic process control module, a fault detection-and-classification module, a virtual metrology module, an internet-of-things module, and a big-data analysis module.

5. The production control system of claim 2, wherein the terminal server is connected to the manufacturing execution server through a relay server supporting the second communications protocol.

6. The production control system of claim 5, wherein the terminal server is connected to the manufacturing execution server through a database server supporting the first communications protocol.

7. The production control system of claim 6, wherein the database server comprises an interface table configured to store the control message.

8. The production control system of claim 5, wherein the relay server is a RV server.

9. The production control system of claim 6, wherein the database server adopts a database link method.

* * * * *